United States Patent [19]
Debe

[11] Patent Number: 5,983,204
[45] Date of Patent: Nov. 9, 1999

[54] SYSTEM AND METHOD FOR SUPPORTING A NEW FINANCIAL INSTRUMENT FOR USE IN CLOSED END FUNDS

[75] Inventor: A. Joseph Debe, Garden City, N.Y.

[73] Assignee: Americus Shareowner Service Corp., New York, N.Y.

[21] Appl. No.: 08/936,170

[22] Filed: Sep. 25, 1997

[51] Int. Cl.[6] ....................................... G06F 15/20
[52] U.S. Cl. ................................. 705/36; 705/35
[58] Field of Search ................. 705/35, 36, 37, 705/38, 8, 10; 345/339; 706/19, 23, 30; 364/733

[56] References Cited

U.S. PATENT DOCUMENTS

| 5,101,353 | 3/1992 | Lupien et al. | 364/408 |
| 5,202,827 | 4/1993 | Sober | 364/408 |

*Primary Examiner*—Allen R. MacDonald
*Assistant Examiner*—Susanna Meinecke-Diaz
*Attorney, Agent, or Firm*—Fulbright & Jaworski, LLP

[57] ABSTRACT

A data processing system for supporting a new financial instrument known as a Put Ratio Equity Protection ("PREP") used in closed end funds. The data processing system provides computer means for brokers and fund managers to effectuate all transactions pertaining to PREPs and the creation of PREP certificates.

3 Claims, 6 Drawing Sheets

PREP CERTIFICATE FOR XYZ FUND

| Purchase Date of Shares | Purchase Date of PREP | Shares Purchased | Share Price | Total Cost |
|---|---|---|---|---|
| 9/1/97 | 9/1/97 | 1000 | $26.50 | $26,500 |

| PREP Cost | Fund NAV | PREP ER | Termination Date |
|---|---|---|---|
| $265.00 | 32.25 | 0.8217 | 12/31/07 |

John Smith
123 Any Street
Your Town USA

PREP CERTIFICATE FOR XYZ FUND

| Purchase Date of Shares | Purchase Date of PREP | Shares Purchased | Share Price | Total Cost |
|---|---|---|---|---|
| 9/1/97 | 9/1/97 | 1000 | $26.50 | $26,500 |

| PREP Cost | Fund NAV | PREP ER | Termination Date |
|---|---|---|---|
| $265.00 | 32.25 | 0.8217 | 12/31/07 |

John Smith
123 Any Street
Your Town USA

SYSTEM AND METHOD FOR SUPPORTING A NEW FINANCIAL INSTRUMENT FOR USE IN CLOSED END FUNDS

FIELD OF THE INVENTION

The present invention relates generally to the field of closed end investment companies. More particularly, the present invention relates to a system and method for supporting a new financial instrument that protects investors in closed end funds from increases in the discount of the market price from the net value asset of the fund.

BACKGROUND OF THE INVENTION

Diversified investment companies, in general, are based on the concept of pooling resources from many investors and benefitting from the expertise of the fund's managers who use their experience to invest the pooled resources to earn financial gains for the investors.

A basic concept of all such funds is the Net Asset Value (NAV) of the fund. The NAV is based on the ratio of a fund's net assets to the number of fund shares outstanding. (i.e., NAV=Net Assets/Shares Outstanding). Changes in the NAV of a fund is a direct measure of a fund's investment performance.

There are generally two broad categories of investment companies: open end (mutual funds) and closed end funds. Investors in open end funds purchase shares of the fund directly from the fund, at a price equal to the NAV of the fund. Investors in closed end funds, on the other hand, purchase shares of the fund on an equity exchange, such as the New York Stock Exchange (NYSE) at the market price (MP) of the fund. Shares of closed end funds are traded on equity exchanges in much the same way as are other equities.

Closed end funds rarely trade at their NAVs but, rather, almost always trade at a discount (or a premium) which is created based on supply and demand. A discount results when the supply of fund shares is greater than the demand by investors, and thus, sellers of the fund shares are forced to accept a lower price for the fund than the NAV. A premium, conversely, results when the demand is higher than the supply and investors are forced to pay a higher price for a limited supply.

There are at least two independent factors that can affect the price per share, and the discount (or premium), of a closed end fund: (1) supply and demand for the fund shares, and (2) the NAV of the fund. Because these two factors act independently, historically, there has been a lack of correlation between the MP of most closed end funds' shares and the respective fund's NAV per share. This lack of correlation in closed end funds is inconsistent with the most sought after benefits of mutual funds, such as portfolio diversification, stated investment objectives, professional management, and investment performance. For instance, an investor who chose to invest in a closed end fund because of its stated objective of capital preservation is, because of the poor correlation between MP and NAV, exposed to the effects of supply and demand on the fund shares which can potentially place the investor's investment at considerable risk.

For example, an investor purchases 1,000 shares of a closed end fund at $25.50 per share at a time when the fund's NAV is $30.00 per share. The discount is 15%, calculated as:

$$\frac{\$30.00 - \$25.50}{\$30.00} * 100\% = 15\%$$

The total investment for this purchase is $25,500 ($25.50 per share×1000 shares). Assume that the investor wants to sell all 1000 shares at some later date on which the price per share is $27.00 and the NAV is $36.00. The discount on this date is 25%, calculated as:

$$\frac{\$36.00 - \$27.00}{\$36.00} * 100\% = 25\%$$

By selling 1000 shares on this date at $27.00, investor earns a gross profit of $1,500 ($27,000–$25,500), which is an increase of 5.88% on the initial investment calculated as:

$$\frac{\$1,500}{\$25,500} * 100\% = 5.88\%$$

Over the same time period, however, the NAV has increased by $6.00 or 20%. If the discount had remained at 15%, the increase of the NAV to $36.00 would have resulted in a price per share of $30.60, calculated as:

$$\$36.00-(\$36.00*0.15)=\$30.60$$

If the investor had sold all 1000 shares at this price, the investor would have earned a gross profit of $5,100 ($30,600–$25,500).

Clearly, because the discount increased from 15% to 25%, the investor earned only $1,500 and lost the potential to earn an additional $3,600. Had the investor been protected against the increase in the discount, the investor would have been able to benefit fully from the increase in the NAV. This did not happen, however, because of the lack of correlation in closed end funds between the MP and the NAV, which is due to market forces acting on the fund shares.

This example illustrates a problem inherent in closed end funds, i.e., the exposure of the fund shares to market risk can cause the discount to increase and thereby preclude an investor from fully benefitting from the true performance of the fund as the performance is measured by the NAV.

The present invention addresses this problem by implementing a method and system for supporting a new financial instrument that protects an investor from increases in the discount of a closed end fund over a specified time period.

SUMMARY OF INVENTION

The present invention relates to a system and method for supporting a new financial instrument for use with closed end funds to protect an investor from increases in the fund's discount from NAV.

The new financial instrument, called a PREP ("Put Ratio Equity Protection"), is intended to be purchased by an investor ("customer") in a closed end fund at about the same time as the investor purchases fund shares. The date of purchase of the closed end fund shares protected by the PREP is the Effective Date (ED) of the PREP. Purchase of a PREP is represented by a PREP certificate that is generated on behalf of the fund. This certificate indicates an Exercise Ratio (ER) which represents the percentage of NAV per share for which the certificate can be exercised (i.e., 1−discount percentage/100%), and a Termination Date (TD) which represents the last date on which the investor may elect to exercise the PREP certificate.

When an investor is ready to sell fund shares, the investor notifies the fund to that effect. The fund then determines whether it is more advantageous for the investor to sell the shares on an equity exchange or to exercise the PREP certificate. Generally, it would be more advantageous for the investor to exercise the PREP certificate if the NAV×PREP ER is greater than the price per share.

If it is not advantageous to the investor to exercise the PREP certificate, the fund will sell the investor's shares on an equity exchange and remit the proceeds to the investor. If, on the other hand, it is more beneficial for the investor to exercise the PREP certificate, the fund will reimburse the investor for the shares at a price of the PREP ER×NAV on the exercise date.

Accordingly, by having purchased a PREP, the investor was protected from the potentially detrimental effects to the price per share caused by market activity.

Presently, no systems or methods exist to enable investors in closed end funds to utilize the PREP financial instrument. Moreover, no systems or methods currently exist to generate PREP certificates as indicia of ownership of a PREP or to maintain an accounting of PREP transactions.

It is therefore an object of the present invention to provide a data processing system that will enable investors to effectuate the use of the PREP financial instrument.

It is a further object of the present invention to provide a system for generating PREP certificates.

It is a further object of the present invention to provide a system and method for maintaining records of all PREP transactions.

Additional objects of this invention will become apparent herein.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention. It should be recognized by those skilled in the art that the specific embodiments disclosed herein may be readily modified for carrying out the same purposes as that of the present invention. Such equivalent constructions should not be deemed to depart from the spirit and scope of the present invention as set forth in the appended claims.

BRIEF DESCRIPTION OF THE DRAWINGS

The present invention is further described in detail below with reference to the accompanying drawings, in which.

DETAILED DESCRIPTION OF THE PREFERRED EMBODIMENTS

Figure 1:
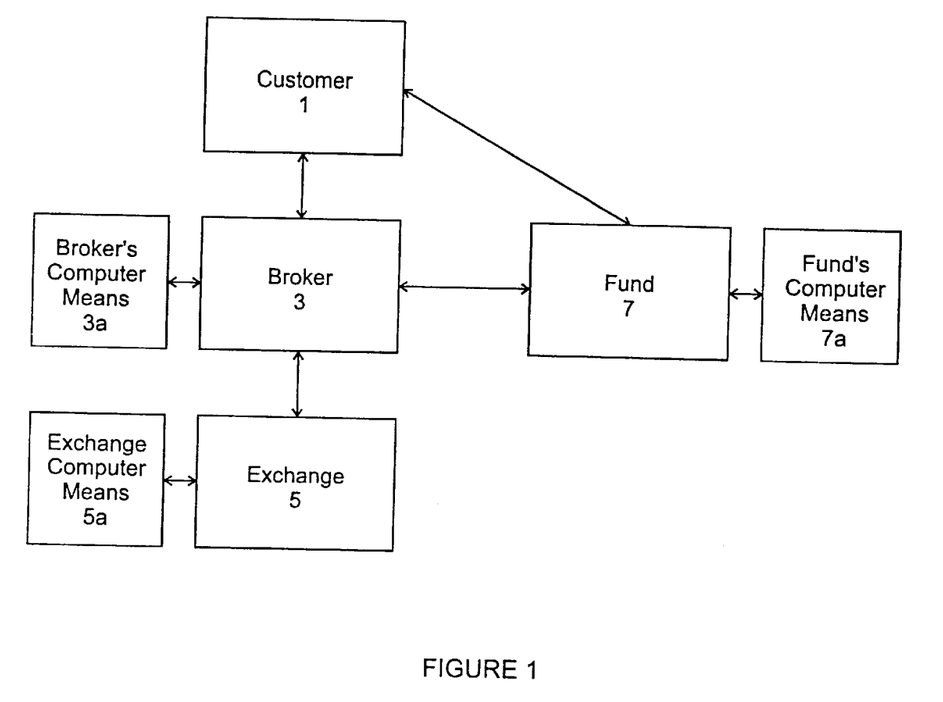
FIG. 1 is block diagram that illustrates the preferred embodiment of the present invention wherein purchases of fund shares are effectuated through a broker while purchases of PREPs are effectuated directly through a fund.

FIG. 1 illustrates an overview of the preferred embodiment of the present invention. According to FIG. 1, a customer 1 wishing to invest in a closed end fund and purchase a PREP communicates with a broker 3 to place an order for a specified number of shares at a given price. The customer 1 can communicate with the broker in any of a number of ways, including, electronic mail, modem, telephone, telefax, etc. When customer 1 places an order with broker 3, customer 1 notifies broker 3 that customer 1 intends to purchase a PREP from fund 7.

Upon receipt of the order, broker 3 uses data entry means to log the customer's order into broker's computer means 3a. Broker's computer means 3a can comprise a database of customer and trade information. The data entry into broker's computer means 3a can be effectuated via keyboard, voice, bar code scanner, etc. Once a customer's order for a purchase is logged into broker's computer means 3a, broker uses any one of a number of standard ways to effectuate the purchase on an exchange 5, such as the NYSE. As the broker 3 effectuates the trade on the exchange 5, the exchange computer means 5a logs the transaction and generates an electronic confirmation ("exchange's confirmation") that is communicated to the broker's computer means 3a. The exchange 5 also transfers indicia of ownership of the purchased shares to the broker 3. If broker 3 was notified by customer 1 that customer 1 intends to purchase a PREP, broker, using broker's computer means 3a, transfers the indicia of ownership of the shares to fund 7.

Upon receipt of the exchange's confirmation, broker's computer means 3a generates a broker's confirmation, generally in the form of a confirmation report, and communicates the broker's confirmation to customer 1.

Upon receipt of broker's confirmation that the requested purchase of fund shares has been completed, customer 1 wishing to purchase a PREP corresponding to such shares communicates with the fund 7 to place an order for the PREP. The price for a PREP can be set by any of a number of methods, including, for example, percentage of total value of shares purchased that are to be covered by a PREP (e.g., 1% of total value of shares purchased), charge per share (e.g., $1.00 per share), or a combination of the total purchase value and charge per share (e.g. 0.5% of total value of shares purchased+$0.10 per share). Upon receipt of customer's order for a PREP, fund computer means 7 checks to see whether broker 3 has transferred indicia of ownership to fund 7 and if the transfer has not been completed fund computer means 7a communicates with broker's computer means 3a to request transfer of such indicia. Once fund's computer means 7a determines that indicia of ownership has been transferred from the broker 3, fund's computer means 7a generates a PREP certificate 9 (see discussion of FIG. 2) as indicia of ownership of a PREP corresponding to the shares purchased by customer 1. Fund's computer means 7a then communicates the PREP certificate 9 to customer 1 in any of a number of ways, including mail, electronic mail, modem, etc.

Figure 2:
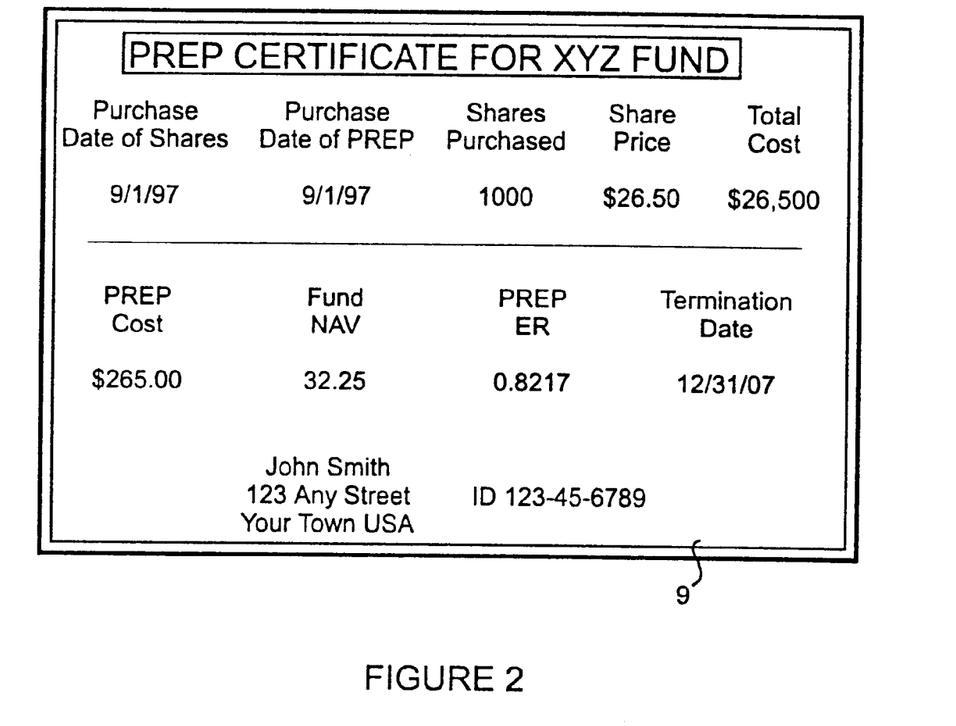
FIG. 2 illustrates a schematic of a PREP certificate.

FIG. 2 illustrates the preferred embodiment of a PREP certificate 9 as a printed report that contains information about the PREP and the corresponding shares. The PREP certificate 9 can also be generated in many other forms such as an electronic file. The PREP certificate 9 includes identifying information regarding the fund 7 (e.g. name of fund, address of fund) and customer 1 (e.g. customer's name, address, identification number), as well as: 1) the purchase date of the fund shares (ED); 2) the purchase date of the PREP; 3) number of shares purchased; 4) purchase price per share; 5) total value of purchase; 6) indicia of the PREP cost; 7) fund NAV; 8) exercise ratio (ER); and 9) PREP termination date. The certificate can also include other information regarding the transaction, such as identification of broker, etc.

Figure 3:
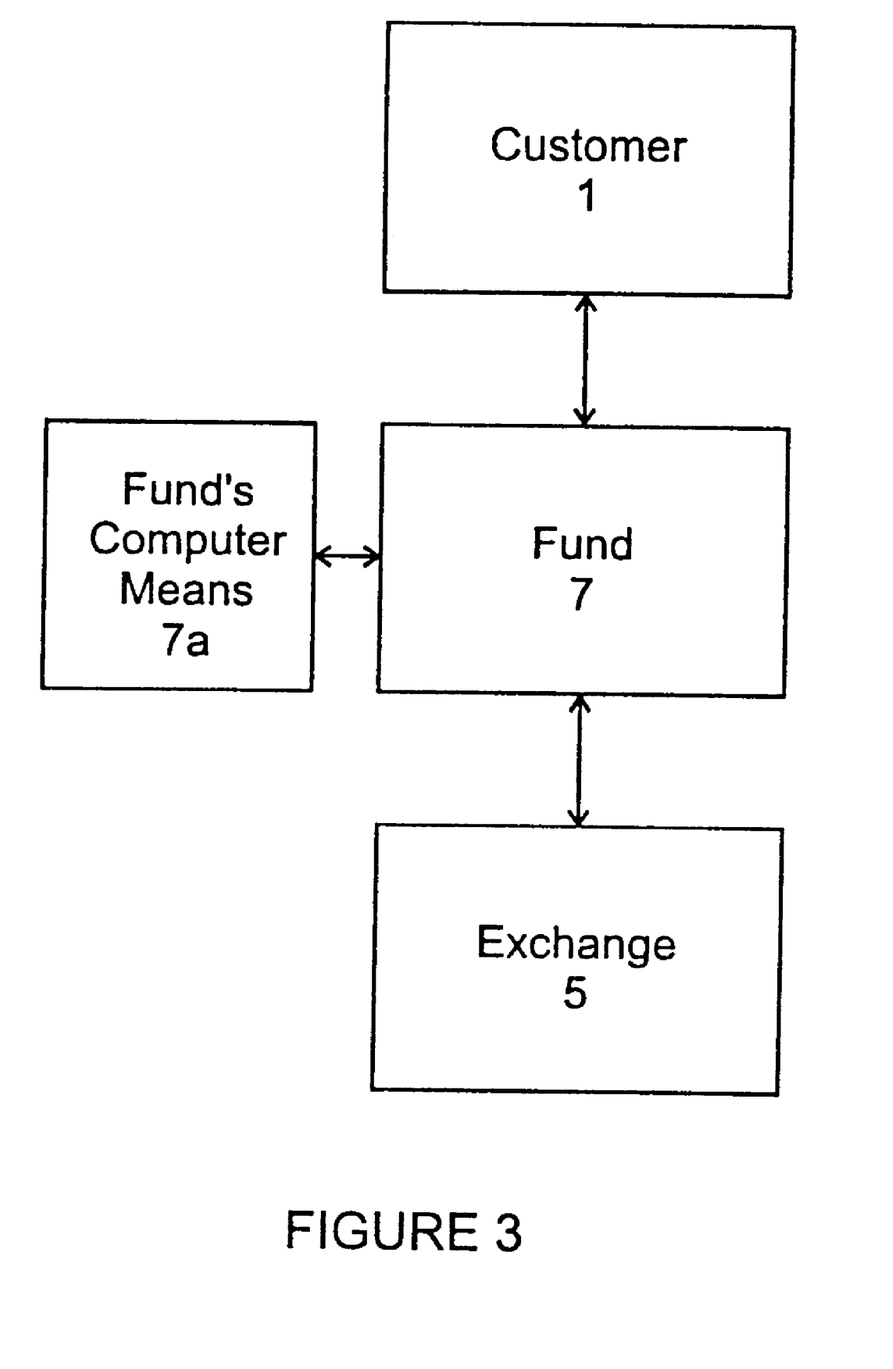
FIG. 3 is a block diagram that illustrates a customer's election of either sale of fund shares or exercise of a PREP certificate.

FIG. 3 shows a block diagram of the procedure a customer 1, having bought fund shares and a corresponding PREP, would follow to sell fund shares. According to FIG. 3, customer 1 wishing to sell fund shares communicates with fund 7 to effectuate the sale. Upon being informed of customer's desire to sell fund shares, fund 7 using fund's computer means 7a makes a determination as to whether it would be more advantageous for customer 1 to sell fund shares or to exercise the PREP certificate 9. To make this determination, fund's computer means 7a makes a comparison of: (a) current price per share; and (b) NAV×PREP ER.

If (a) is greater than (b), fund 7 effectuates the sale of shares on exchange 5 and remits proceeds to customer 1 according to customer's instructions (e.g., send proceeds to customer, transfer proceeds to customer's account with broker 3, purchase additional shares for customer).

If (a) is less than (b), customer's PREP certificate 9 is exercised and customer is remitted the proceeds (amount calculated in (b)×number of fund shares covered by PREP), according to customer's instructions. It is foreseen that fund 7 may charge a transaction or other type of fee in exchange for its service to customer 1.

The following examples illustrates how a find's computer means 7a determines whether to sell shares or to exercise the PREP certificate 9.

EXAMPLE 1

Assume that on Jun. 2, 1997, customer 1 purchases 1,000 shares of the closed end fund Tri-Continental ("TY") at $26.50 per share, based on a current NAV of $32.25 per share, and buys a PREP for 1% of total transaction value ($265.00). The discount in this example is 17.83% calculated as follows:

$$\frac{\$32.25 - \$26.50}{\$32.25} * 100\% = 17.83\%$$

The PREP exercise ratio is 82.17% of NAV ((1−discount/100%) or equivalently ($26.50/$32.25)). The termination date is set to Dec. 31, 2007.

Further assume that on Nov. 29, 1999 customer 1 wishes to sell 1,000 shares of TY when the price of TY is $30.00 and the NAV is $40.00 per share. The discount has now increased from 17.83% to 25%, calculated as:

$$\frac{\$40.00 - \$30.00}{\$40.00} * 100\% = 25\%$$

The fund's computer means 7a now calculates (a) and (b), above, as (a)=$30.00 and (b)=$32.868 ($40.00×82.17%). Without the PREP (option (a)), customer 1 would realize proceeds of $30,000 ($30.00 per share×1,000 shares) whereas by exercising the PREP certificate 9, (option (b)) customer 1 would realize proceeds of $32,868 ($32.868 per share×1,000 shares). Accordingly, in this example, fund 7 would exercise the PREP certificate 9 rather that sell the fund shares on exchange 5.

EXAMPLE 2

Now assume that instead of an increase of the discount from 17.83% to 25%, as in the previous example, the discount is reduced from 17.83% to 10%. The attendant stock price of $36.00 would mean that the proceeds of $36,000 from sale of TY on the exchange 5 would be more advantageous than the $32,868 that customer 1 could realize from exercise of the PREP certificate 9. In this example, therefore, the fund 7 would sell the fund shares on exchange 5 rather than exercise the PREP certificate 9.

Figure 4:
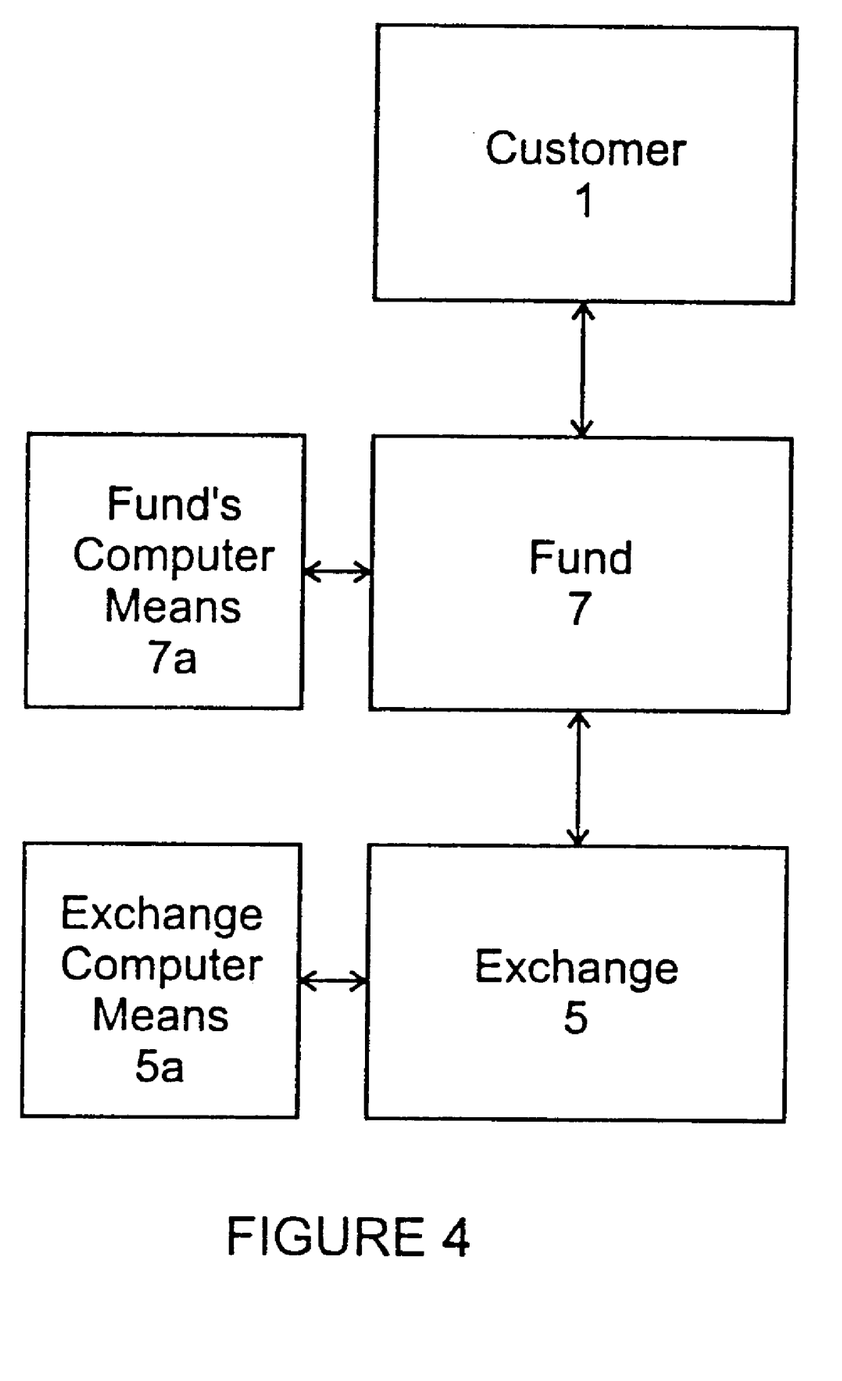
FIG. 4 is a block diagram that illustrates an embodiment of the present invention wherein purchases of fund shares and PREPs are effectuated through a fund.

FIG. 4 shows an embodiment of the present invention wherein purchases of fund shares and PREPs are effectuated through a fund. According to FIG. 4, a customer 1, communicates an order for fund shares and a corresponding PREP directly to a fund 7, using any number of available communication means. Upon receipt of order from customer 1, fund 7 effectuates the purchase of fund shares on exchange 5 through fund's own broker or other means. As the fund 7 effectuates the trade on the exchange 5, the exchange computer means 5a logs the transaction and generates an exchange's confirmation that is communicated to the fund's computer means 5a. The exchange 5 also transfers indicia of ownership of the purchased shares to the fund 7. Upon receipt of the exchange's confirmation, fund's computer means 7a generates a confirmation for the customer and a PREP certificate 9 indicative of customer's purchase of a PREP. When customer 1 is ready to sell the fund shares, customer 1 can effectuate the sale as discussed above in reference to FIG. 3.

One benefit of a customer 1 ordering fund shares and PREPs directly from the fund 7, is that there is no need for broker 3 to transfer indicia of ownership of fund shares to the fund 7 because the fund 7 receives such indicia directly from the exchange 7. Moreover, if a fund 7 handles both transactions, the fund 7 is likely to charge a lower fee than would a broker 3.

Figure 5:
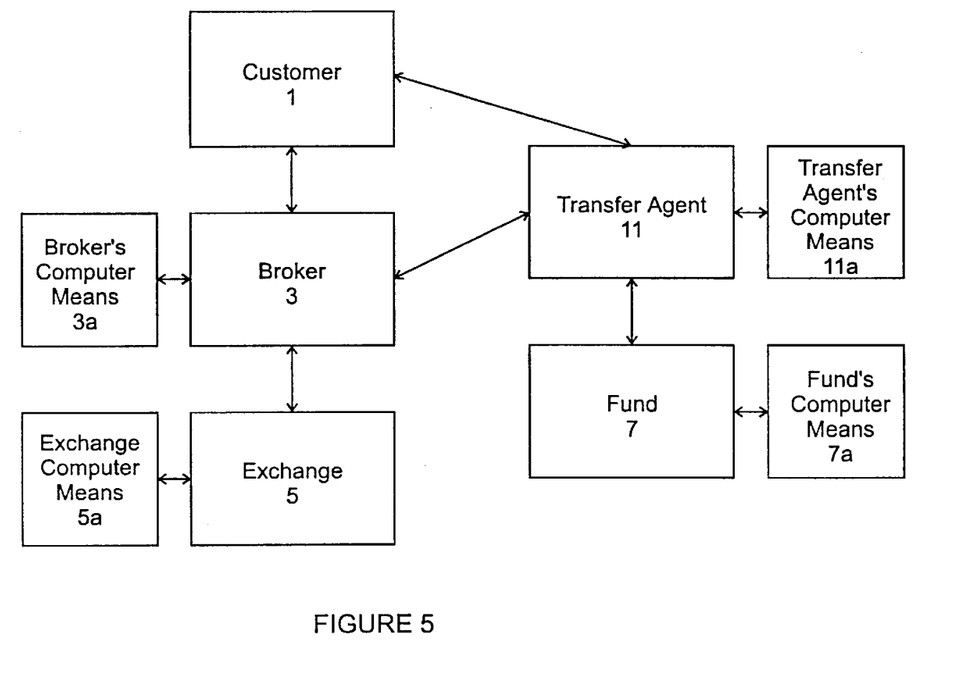
FIG. 5 is a block diagram that illustrates an embodiment of the present invention wherein a transfer agent or other entity handles PREP transactions on behalf of a fund and where customer purchases fund shares through a broker and PREPs through a transfer agent.

FIG. 5 shows an embodiment of the present invention wherein transfer agent 11 or similar entity handles the PREP transactions on behalf of fund 7 and where customer 1 purchases fund shares through broker 3 and PREPs through a transfer agent 11. According to FIG. 5, customer 1 communicates an order for fund shares to broker 3 and notifies broker 3 of the intention to purchase a PREP. Broker 3 then effectuates a purchase of the shares on exchange 5 and communicates broker's confirmation to customer 1, as explained in reference to FIG. 1 above. Because customer 1 indicated to broker 3 that customer 1 intends to purchase a PREP, upon broker's receipt of indicia of fund share ownership from exchange 5, broker 3 transfers this indicia of ownership to transfer agent 11.

Upon receipt of broker's confirmation, customer 1 communicates a request to transfer agent 11 for the purchase of a PREP corresponding to the purchased shares. Upon receipt of this order, transfer agent 11 logs the order into transfer agent's computer means 11a which checks to see whether broker 3 has transferred indicia of ownership of the fund shares to transfer agent 11. If the transfer has not been completed transfer agent's computer means 11 a communicates with broker's computer means 3a to request transfer of such indicia. Once transfer agents's computer means 11a determines that indicia of ownership has been transferred from the broker 3, transfer agent's computer means 11a generates a PREP certificate 9 (see discussion of FIG. 2). Transfer agent's computer means 11a then communicates the PREP certificate 9 to customer 1.

In this embodiment, transfer agent's computer means 11a communicates with fund's computer means 7a to report the transfer agent's activities pertaining to PREP transactions. Fund's computer means 7a can keep an independent record of all PREP transactions and thereby have a way of determining at any give time the fund's potential liability.

When customer 1 wants to sell the fund shares, customer 1 can arrange for a sale with transfer agent 11. Upon being informed of customer's desire to sell fund shares, transfer agent 11 using transfer agent's computer means 11a makes a determination as to whether it would be more advantageous for customer 1 to sell fund shares or to exercise the PREP certificate 9. This comparison is effectuated in the same way as described in reference to FIG. 3, wherein the comparison was done by the fund's computer means 7a. The transfer agent's computer means 11a then determines whether it would be more advantageous for customer 1 to sell the fund shares (at the current price per share) or to exercise the PREP certificate 9 (at the current NAV×PREP ER). Upon making this determination, transfer agent 11 either effectuates the sale or exercises the PREP certificate 9, accordingly, as described in reference to FIG. 3 wherein this action was preformed by the fund 7.

Figure 6:
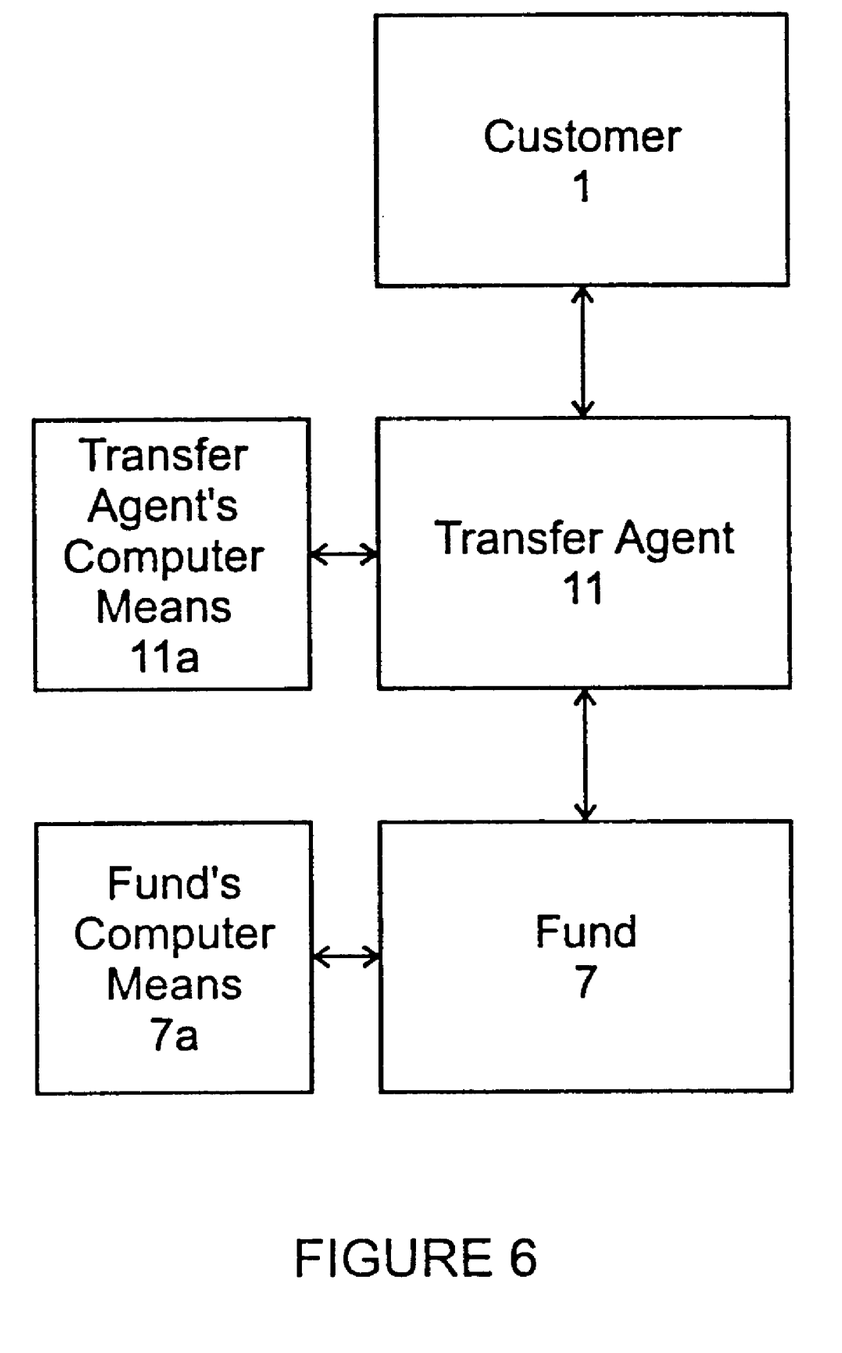
FIG. 6 is a block diagram that illustrates an embodiment of the present invention wherein a transfer agent or other entity handles PREP transactions on behalf of a fund and where customer purchases fund shares and PREPs through a transfer agent.

FIG. 6 shows an embodiment of the present invention wherein transfer agent 11 or similar entity handles the PREP transactions on behalf of fund 7 and where customer 1 purchases fund shares and PREPs through transfer agent 11. According to FIG. 6, customer 1 communicates with transfer agent 11 to place an order for fund shares and the accompanying PREP. Transfer agent 11 logs the order into transfer agent's computer means 11a and effectuates the purchase of the shares through exchange 5. As transfer agent 11 effectuates the trade on the exchange 5, the exchange computer means 5a logs the transaction and generates an exchange's confirmation that is communicated to the transfer agent's computer means 1a. The exchange 5 also transfers indicia of ownership of the purchased shares to the transfer agent 11. Upon receipt of the exchange's confirmation, transfer agent's computer means 11a generates a confirmation for the customer and a PREP certificate 9 indicative of customer's purchase of a PREP.

In this embodiment, transfer agent's computer means 11a communicates with fund's computer means 7a to report the transfer agent's activities pertaining to PREP transactions. Fund's computer means 7a can keep an independent record of all PREP transactions and thereby have a way of determining the fund's potential liability at any given time.

When customer 1 is ready to sell the fund shares, customer 1 can effectuate the sale as discussed above in reference to FIG. 3.

It should be understood that the preferred embodiments and any examples described are for illustrative purposes only and are not to be construed as limiting the scope of the present invention which is properly delineated only in the appended claims.

We claim:

1. A data processing system for supporting a Put Ratio Equity Protection ("PREP") financial instrument, said system comprising:
    (a) a broker's computer means for processing requests of customers to purchase at least one share of a closed end fund and a corresponding PREP having a given Exercise Ratio;
    (b) a broker's communication means for communicating the requests to a fund manager;
    (c) a fund manager's computer means for processing the requests and generating a PREP certificate bearing indicia representative of at least the Exercise Ratio; and
    (d) a fund manager's communication means for communicating the PREP certificate to the respective customers.

2. A data processing system for supporting a Put Ratio Equity Protection ("PREP") financial instrument, said system comprising:
    (a) a fund manager's computer means for processing requests of customers to purchase at least one share of a closed end fund and a corresponding PREP having a given Exercise Ratio, said fund manager's computer means capable of generating a PREP certificate bearing indicia representative of at least the Exercise Ratio;
    (b) a fund manager's communication means for communicating the PREP certificate to the customer.

3. A data processing system for supporting a Put Ratio Equity Protection ("PREP") financial instrument, said system comprising:
    (a) a broker's computer means for processing requests of customers to sell on a given sale date at least one share of a closed end fund and a corresponding PREP having a given Exercise Ratio;
    (b) a broker's communication means for communicating the requests to a fund manager;
    (c) a fund manager's computer means for determining the product of the Exercise Ratio and the closed end fund's Net Asset Value per share for the sale date, and for comparing said product to the closed end fund's share price on the sale date to determine whether a higher sale price results from exercising the PREP or selling shares of the closed end fund at the shares' price on the sale date; and
    (d) a fund manager's communications means for communicating to a transfer agent instructions to either exercise the PREP certificate or sell shares of the closed end fund at the shares' price on the sale date.

* * * * *